(12) United States Patent
Cohen

(10) Patent No.: US 8,310,927 B1
(45) Date of Patent: Nov. 13, 2012

(54) PRIORITY SCHEME FOR CONTROL TRAFFIC IN NETWORK SWITCHES

(75) Inventor: Yuval Cohen, Raanana (IL)

(73) Assignee: Marvell International Ltd., Hamilton (BM)

(*) Notice: Subject to any disclaimer, the term of this patent is extended or adjusted under 35 U.S.C. 154(b) by 1136 days.

(21) Appl. No.: 10/832,783

(22) Filed: Apr. 27, 2004

(51) Int. Cl.
*H04J 1/16* (2006.01)
*H04L 12/66* (2006.01)
*H04L 12/28* (2006.01)

(52) U.S. Cl. ........ 370/231; 370/235; 370/338; 370/356; 370/401; 370/412

(58) Field of Classification Search .................. None
See application file for complete search history.

(56) References Cited

U.S. PATENT DOCUMENTS

| | | | | |
|---|---|---|---|---|
| 5,440,553 A * | 8/1995 | Widjaja et al. | ................. | 370/411 |
| 6,292,489 B1 * | 9/2001 | Fukushima et al. | ........... | 370/401 |
| 6,609,316 B2 * | 8/2003 | Ohba et al. | ................ | 370/395.42 |
| 6,678,248 B1 * | 1/2004 | Haddock et al. | ............... | 370/235 |
| 6,868,065 B1 * | 3/2005 | Kloth et al. | .................... | 370/236 |
| 7,145,888 B2 * | 12/2006 | Dale et al. | ...................... | 370/321 |
| 7,167,474 B2 * | 1/2007 | Sugai et al. | .................... | 370/392 |
| 2004/0029598 A1 * | 2/2004 | Guggisberg | ................... | 455/466 |
| 2004/0081093 A1 * | 4/2004 | Haddock et al. | ............... | 370/230 |

* cited by examiner

*Primary Examiner* — Melanie Jagannathan (57) ABSTRACT

A method, apparatus, and computer program media for a network device comprises a processor; a forwarding engine comprising a plurality of ports to receive packets of data, wherein the packets comprise control packets each addressed to the processor and comprising a priority code representing one of M priorities; N queues each associated with one or more of the M priorities; a decoder to enqueue each of the control packets to one of the N queues according to the priority code in the control packet and a mapping between the N queues and the M priorities; and a scheduler to pass the control packets from the n queues to the processor according to a priority scheme for the N queues.

27 Claims, 6 Drawing Sheets

PRIORITY SCHEME FOR CONTROL TRAFFIC IN NETWORK SWITCHES

BACKGROUND

The present invention relates generally to data communications. More particularly, the present invention relates to a priority scheme for control traffic in network switches.

In modern network devices such as network switches and routers, it is necessary to prioritize control traffic in order to avoid over-burdening the processors of the network devices, and to ensure the most important control traffic reaches the processors first. One conventional scheme is to use a rule-based classifier to pass control packets received by a network device to its processor in order of importance, as described below with respect to FIGS. 1 and 2.

Figure 1:
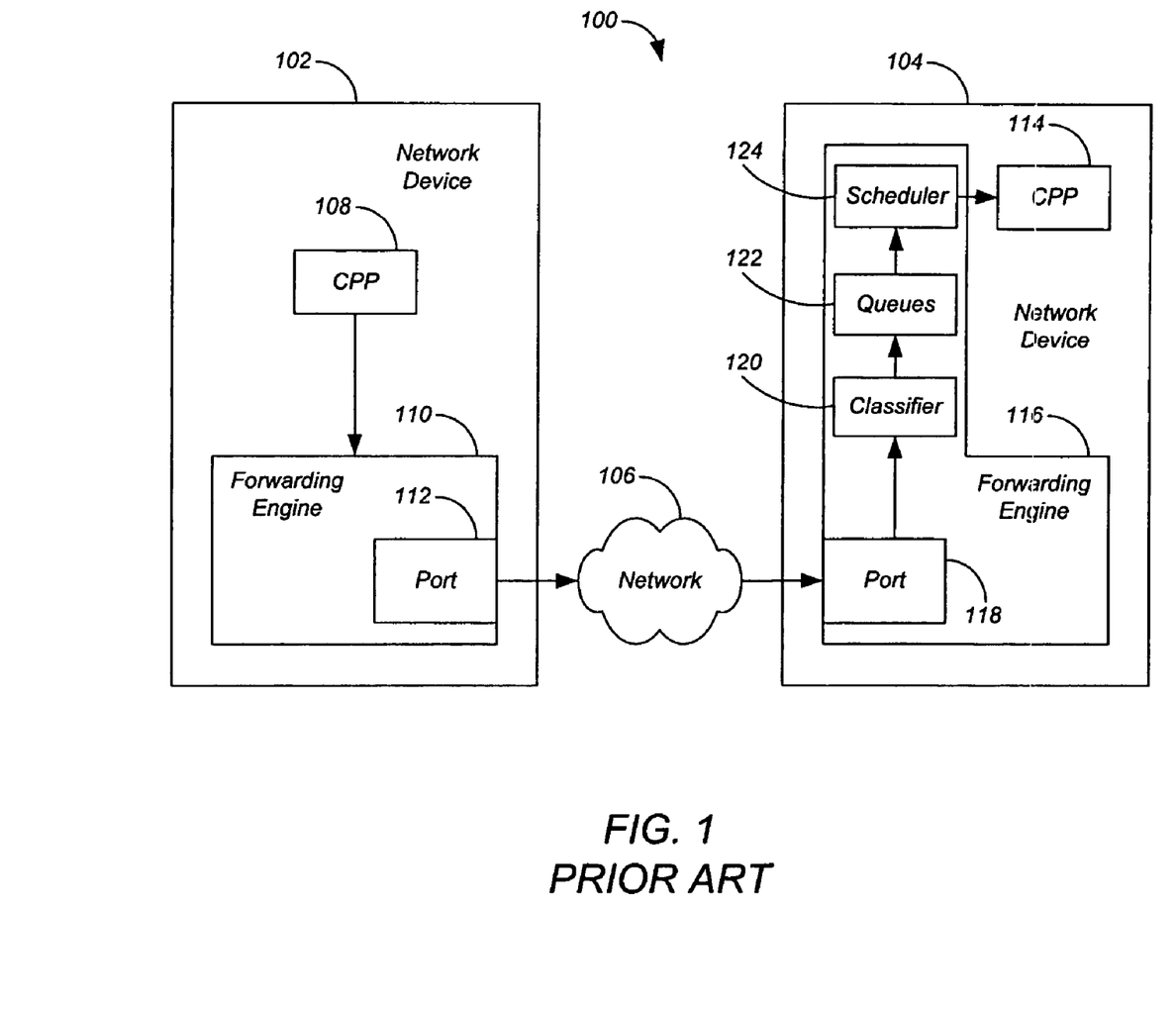
FIG. 1 shows a conventional data communications system comprising conventional network devices such as network switches connected by a network such as the Internet.

FIG. 1 shows a conventional data communications system 100 comprising conventional network devices 102 and 104 such as network switches connected by a network 106 such as the Internet. Network device 102 comprises a control plane processor (CPP) 108 and a forwarding engine 110 comprising one or more ports 112. Network device 104 comprises a CPP 114 and a forwarding engine 116 comprising one or more ports 118, a classifier 120, a plurality of queues 122, and a scheduler 124.

Figure 2:
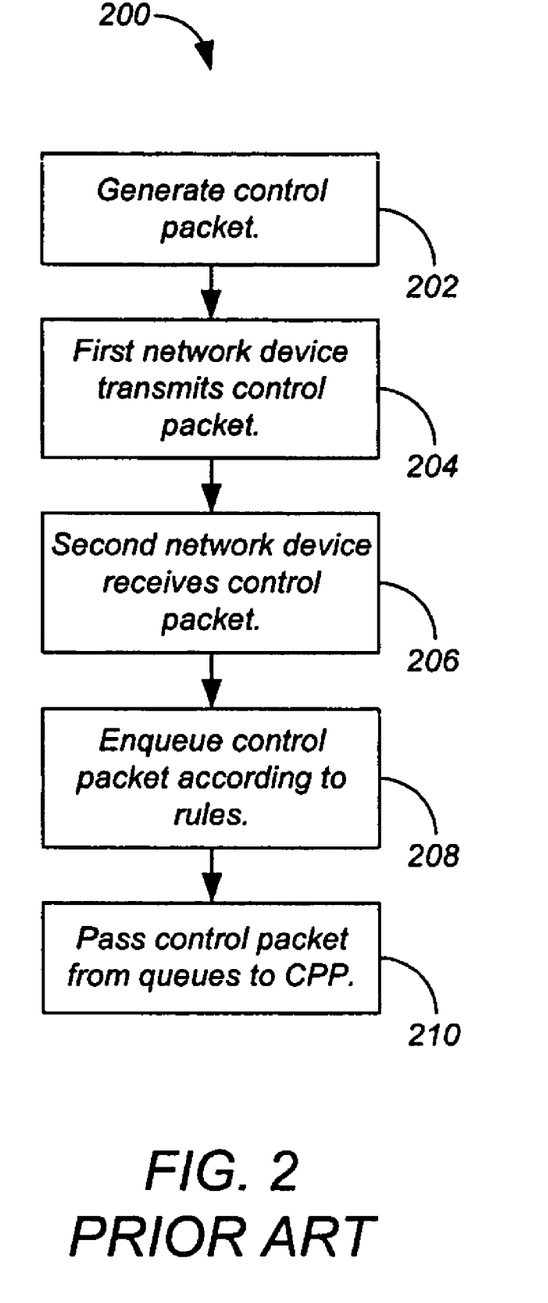
FIG. 2 shows a conventional process for data communications system.

FIG. 2 shows a conventional process 200 for data communications system 100. FIG. 2 shows a process 200 for data communications system 100 according to a preferred embodiment. CPP 108 in network device 102 generates a packet of data that is to be sent to CPP 114 in network device 104 (step 202). Such packets are referred to herein as "control packets" because they are exchanged between control plane processors to control data communications system 100. Port 112 of network device 102 then transmits the control packet to network 106 (step 204).

Port 118 of network device 104 receives the control packet from network 106 (step 206). Classifier 120 enqueues the control packet to one of queues 122 according to a set of sequentially-executed predetermined rules, as is well-known in the relevant arts (step 208). Each queue 122 is associated with one or more of the priorities in the priority scheme. Scheduler 124 passes the control packets from queues 122 to CPP 114 according to a scheduling scheme (step 210).

However, the use of classifiers to perform packet classification has several disadvantages. Because fast classifiers consume considerable silicon resources, it is expensive to add a classifier to a design. Of course, the design may already include a classifier for other purposes. But such a classifier usually has a limited number of rules available. Therefore using such a classifier to classify traffic to the CPP reduces the number of rules available to the user. Finally, for some control packets, the classification method to identify specific control packets may be so complex that it is beyond the capabilities of the classifier.

SUMMARY

In general, in one aspect, the invention features a method, apparatus, and computer program media for a network device. It comprises a processor; a forwarding engine comprising a plurality of ports to receive packets of data, wherein the packets comprise control packets each addressed to the processor and comprising a priority code representing one of M priorities; N queues each associated with one or more of the M priorities; a decoder to enqueue each of the control packets to one of the N queues according to the priority code in the control packet and a mapping between the N queues and the M priorities; and a scheduler to pass the control packets from the n queues to the processor according to a priority scheme for the N queues.

Particular implementations can include one or more of the following features. An Ethernet switch comprises the apparatus. The Ethernet switch is compliant with IEEE 802.3ab. M=N. The decoder comprises a demultiplexer. A data communications system comprises the network device of claim 1; and a second network device in communication with the network device and comprising a second processor to generate the priority codes for the control packets based on characteristics of the control packets, and a second forwarding engine comprising at least one second port to transmit the control packets. The characteristics of the control packets are selected from the group consisting of processor traffic protocols; network protocols; applications; and addresses. The processor traffic protocols are selected from the group consisting of Open Shortest Path First Protocol (OSPF); and Routing Information Protocol (RIP). The network protocols are selected from the group consisting of Dynamic Host Configuration Protocol (DHCP); Simple Network Management Protocol (SNMP); Internet Group Management Protocol (IGMP); Trivial File Transfer Protocol (TFTP); File Transfer Protocol (FTP); Border Gateway Protocol (BGP); and Transmission Control Protocol (TCP). The applications are selected from the group consisting of ping; and telnet.

In general, in one aspect, the invention features a method, apparatus, and computer program media for a network device. It comprises a plurality of ports to transmit packets of data, wherein the packets comprise control packets each addressed to a processor of a second network device and comprising a priority code representing one of a plurality of priorities; and a processor to generate the priority codes for the control packets based on characteristics of the control packets.

Particular implementations can include one or more of the following features. An Ethernet switch comprises the apparatus. The Ethernet switch is compliant with IEEE 802.3ab. The processor traffic protocols are selected from the group consisting of Open Shortest Path First Protocol (OSPF); and Routing Information Protocol (RIP). The network protocols are selected from the group consisting of Dynamic Host Configuration Protocol (DHCP); Simple Network Management Protocol (SNMP); Internet Group Management Protocol (IGMP); Trivial File Transfer Protocol (TFTP); File Transfer Protocol (FTP); Border Gateway Protocol (BGP); and Transmission Control Protocol (TCP). The applications are selected from the group consisting of ping; and telnet.

In general, in one aspect, the invention features a method, apparatus, and computer program media for a network device. It comprises a plurality of ports to receive packets of data, wherein the packets comprise control packets each addressed to a processor of a second network device; and a classifier to determine one of a plurality of priorities for each of the control packets based on characteristics of the control packets, and to insert a priority code representing the determined priority into each of the control packets; wherein the ports transmit the control packets.

Particular implementations can include one or more of the following features. An Ethernet switch comprises the apparatus. The Ethernet switch is compliant with IEEE 802.3ab. The processor traffic protocols are selected from the group consisting of Open Shortest Path First Protocol (OSPF); and Routing Information Protocol (RIP). The network protocols are selected from the group consisting of Dynamic Host Configuration Protocol (DHCP); Simple Network Management Protocol (SNMP); Internet Group Management Protocol (IGMP); Trivial File Transfer Protocol (TFTP); File Transfer Protocol (FTP); Border Gateway Protocol (BGP); and Transmission Control Protocol (TCP). The applications are selected from the group consisting of ping; and telnet.

The details of one or more implementations are set forth in the accompanying drawings and the description below. Other features will be apparent from the description and drawings, and from the claims.

The leading digit(s) of each reference numeral used in this specification indicates the number of the drawing in which the reference numeral first appears.

DETAILED DESCRIPTION

Figure 3:
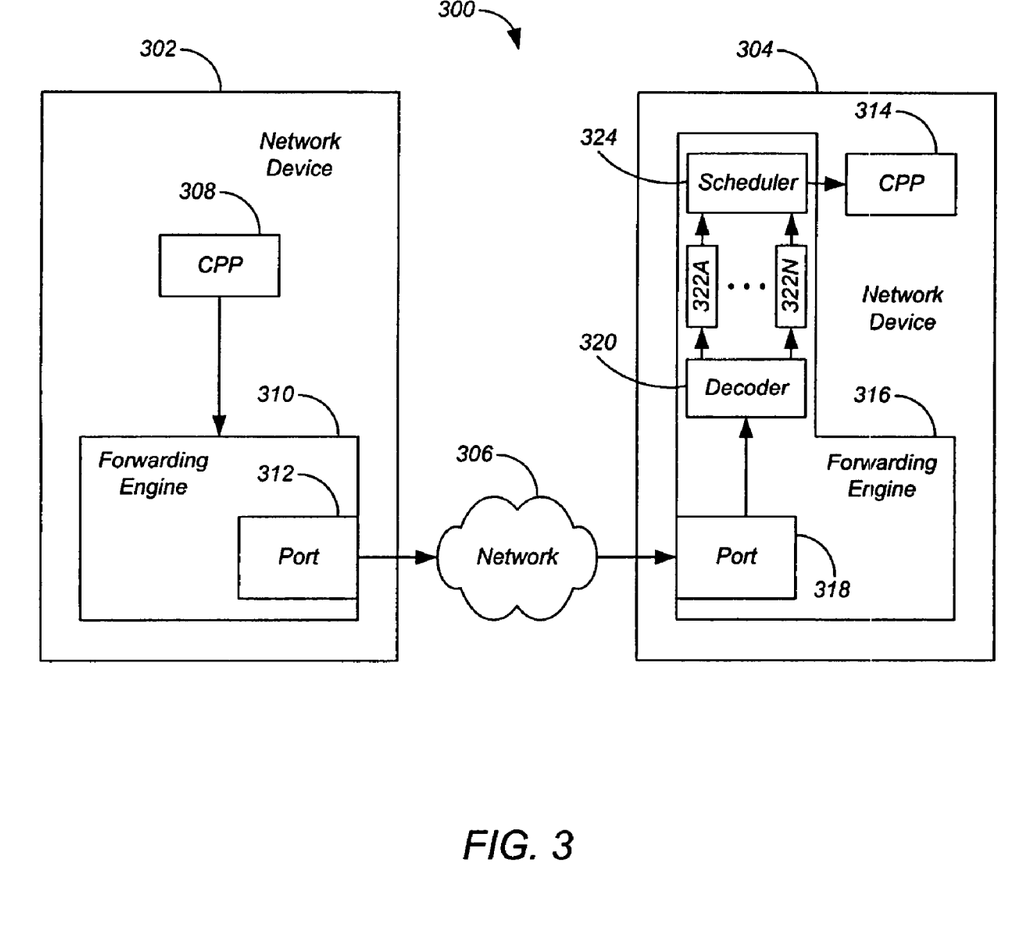
FIG. 3 shows a data communications system according to a preferred embodiment of the present invention.

FIG. 3 shows a data communications system 300 according to a preferred embodiment of the present invention. Data communications system 300 comprises network devices 302 and 304 such as Ethernet switches including Gigabit Ethernet switches compliant with IEEE 802.3ab connected by a network 306 such as the Internet. Network device 302 comprises a control plane processor (CPP) 308 and a forwarding engine 310 comprising one or more ports 312. Network device 304 comprises a CPP 314 and a forwarding engine 316 comprising one or more ports 318, a decoder 320, a plurality of queues 322A through 322N, and a scheduler 324.

Figure 4:
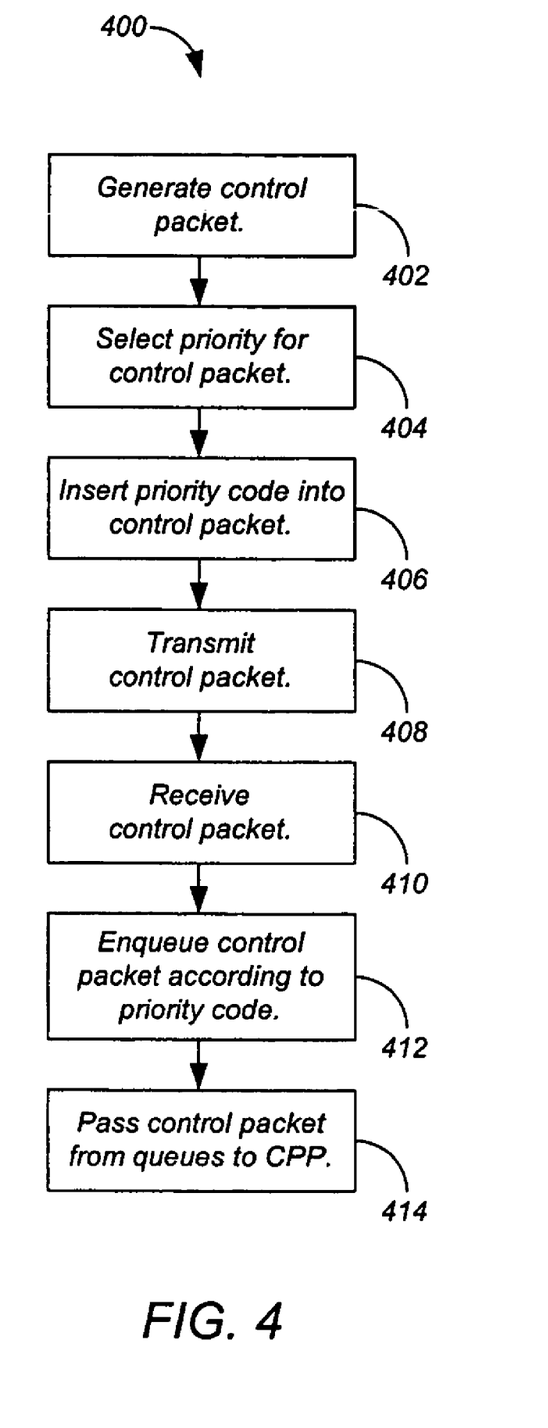
FIG. 4 shows a process for the data communications system of FIG. 3 according to a preferred embodiment.

FIG. 4 shows a process 400 for data communications system 300 according to a preferred embodiment. CPP 308 in network device 302 generates a packet of data that is to be sent to CPP 314 in network device 304 (step 402). Such packets are referred to herein as "control packets" because they are exchanged between control plane processors to control data communications system 300.

CPP 308 selects one of a plurality of priorities for the control packet based on characteristics of the control packet (step 404). For example, in a two-priority scheme based on the processor traffic protocol of the control packet, CPP 308 selects the high priority when the control packet is an Open Shortest Path First Protocol (OSPF) packet, and selects the low priority when the control packet is a Routing Information Protocol (RIP) packet. Of course, other characteristics of the control packet can be used, either alone or in combination, such as other network protocols, applications, and addresses of the control packet. For example, the network protocols can include Dynamic Host Configuration Protocol (DHCP), Simple Network Management Protocol (SNMP), Internet Group Management Protocol (IGMP), Trivial File Transfer Protocol (TFTP), File Transfer Protocol (FTP), Border Gateway Protocol (BGP), Transmission Control Protocol (TCP), and others. The applications can include ping, telnet, and others.

While embodiments of the present invention are described in terms of a priority scheme having N priorities and N queues 322, other embodiments have a number of priorities M that differs from the number of queues 322. In such embodiments, a simple mapping is employed between the M priorities and the N queues, as would be apparent to one of ordinary skill in the relevant arts. Of course, in the described embodiments, the mapping is one-to-one.

CPP 308 inserts a priority code representing the selected priority into the control packet (step 406). The priority code is preferably one or more bits inserted into an unused field in the header of the control packet, although other techniques can be used. Port 312 of network device 302 then transmits the control packet to network 306 (step 408).

Port 318 of network device 304 receives the control packet from network 306 (step 410). Decoder 320 enqueues the control packet to one of queues 322 according to the priority code in the control packet and a mapping between the queues 322 and the priorities (step 412). In contrast to the conventional classifier 120 of FIG. 1, which classifies packets in a cumbersome and time-consuming manner according to a sequentially-executed set of rules, decoder 320 simply decodes the priority code in the control packet. As such, decoder 320 can be implemented very simply, for example as a demultiplexer.

Each queue 322 is associated with one or more of the priorities in the priority scheme. Scheduler 324 passes the control packets from queues 322 to CPP 314 according to a priority scheme for queues 322 such as round-robin or fairness (step 414).

In this manner, control traffic is prioritized and passed to the destination control plane processor in a fact and efficient manner fact enough for high-speed networks such as Gigabit Ethernet.

In data communications system 300, network device 304 accepts the priority codes of incoming control packets without question. In other words, network 306 is a "trusted" network. But in "untrusted" networks, hackers could exploit trust for malicious purposes. For example, a hacker could send thousands of ping packets with a high priority code to network device 304 to stage a denial-of-service attack. To combat this threat, network administrators employ technologies such as "edge routers" or "border routers" to protect an internal trusted network from an external untrusted network such as the Internet.

Figure 5:
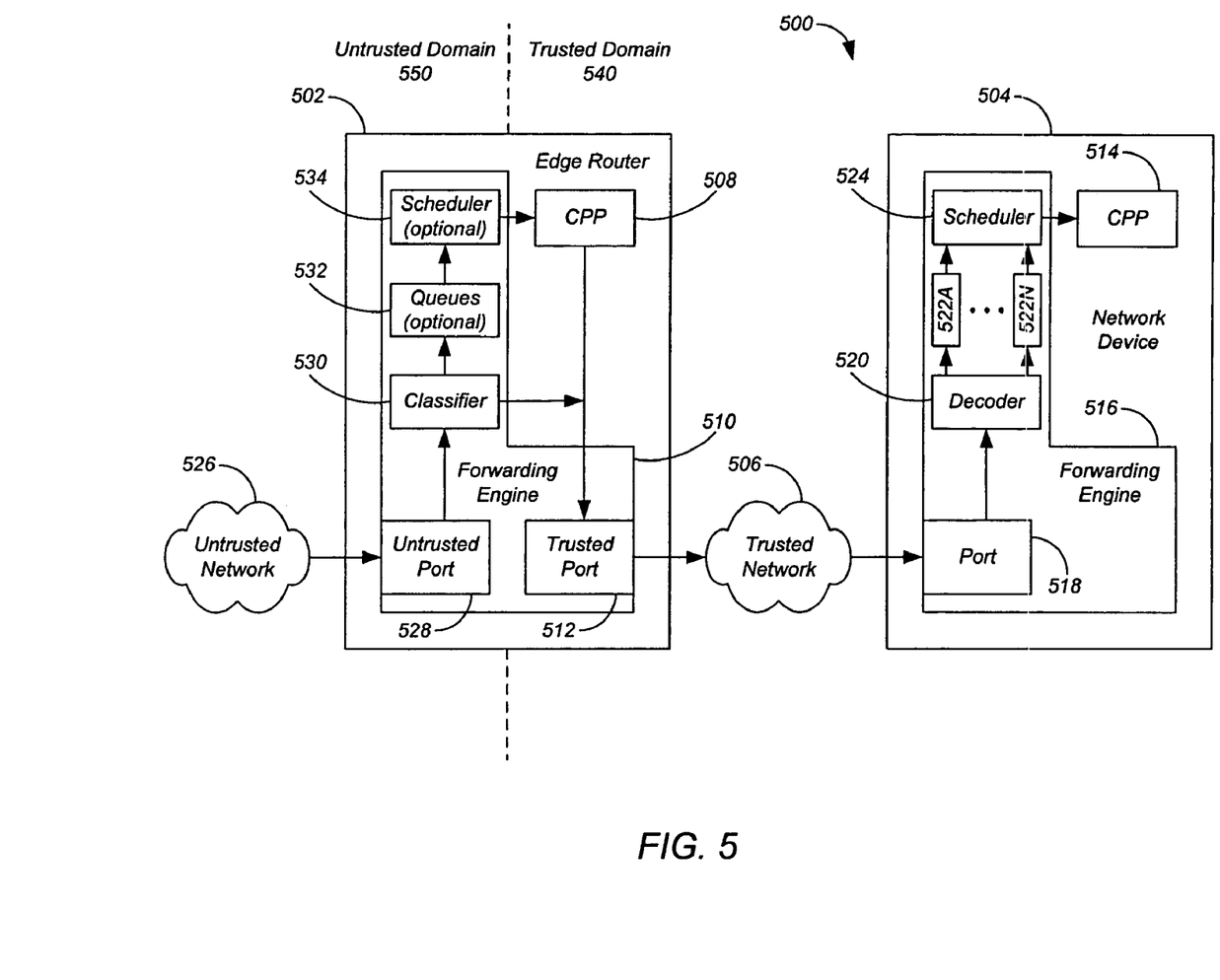
FIG. 5 shows a data communications system comprising a trusted domain and an untrusted domain according to a preferred embodiment of the present invention.

FIG. 5 shows a data communications system 500 comprising a trusted domain 540 and an untrusted domain 550 according to a preferred embodiment of the present invention. Data communications system 500 comprises network devices 502 and 504 such as Ethernet switches connected by a trusted network 506 such as the Internet. Network device 502 is implemented as an edge router to protect trusted domain 540 from untrusted domain 550.

Edge router 502 comprises a control a plane processor (CPP) 508 and a forwarding engine 510 comprising one or more trusted ports 512, one or more untrusted ports 528, a classifier 530, optional queues 532, and an optional scheduler 534. Network device 504 comprises a CPP 514 and a forwarding engine 516 comprising one or more ports 518, a decoder 520, a plurality of queues 522A through 522N, and a scheduler 524.

Figure 6:
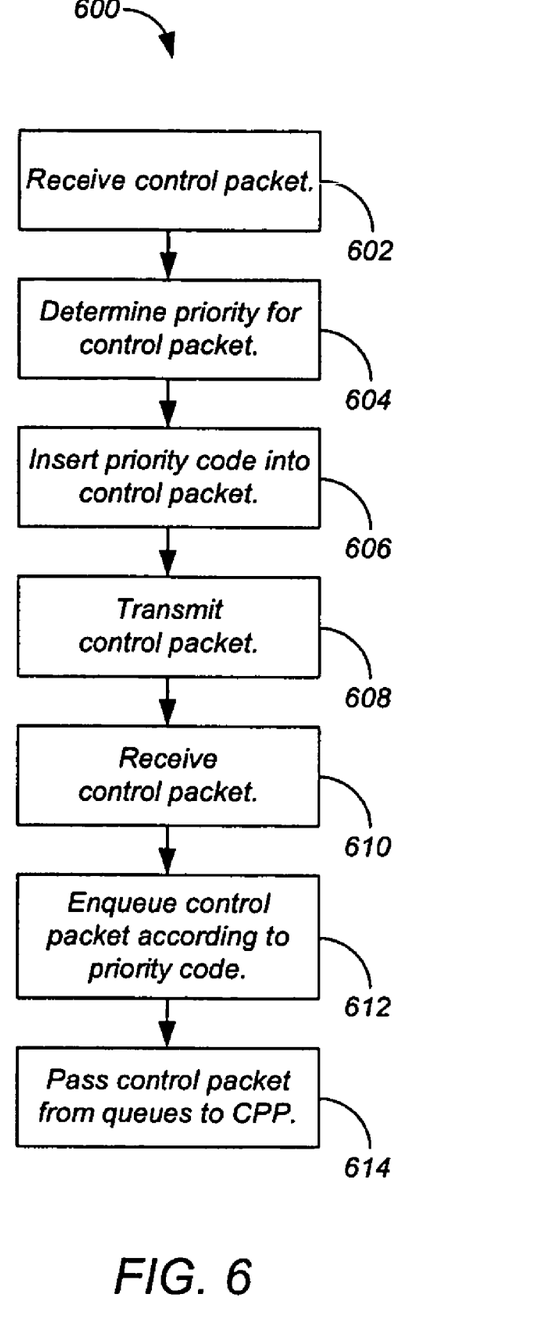
FIG. 6 shows a process for the data communications system of FIG. 5 according to a preferred embodiment.

FIG. 6 shows a process 600 for data communications system 500 according to a preferred embodiment. Edge router 502 receives control packets addressed to CPP 514 of network device 504 from untrusted network 526 on untrusted port 528 (step 602). The control packets may contain priority codes of the kind used within trusted network 506. However, because the control packets originated from untrusted network 526, their priority codes are not trusted, and so are ignored. Instead, edge router 502 determines the priorities of each control packet based on characteristics of the control packet (step 604), and inserts a priority code representing the determined priority into the control packet (step 606). The priority code can be inserted by CPP 508 or by forwarding engine 510.

In some embodiments, edge router 502 employs a classifier 530 that implements a set of rules that determine the priority and insert the priority code. Any priority code the control packets had on arrival at edge router 502 is deleted or replaced with the priority code generated by edge router 502. One advantage of this implementation is that CPP 508 is not burdened, and optional queues 532 and optional scheduler 534 are unnecessary. In other embodiments, CPP 508 determines the priority and inserts the priority code. In still other embodiments, classifier 530 and CPP 508 work together to determine the priority and insert the priority code. Trusted port 512 then transmits the control packets to trusted network 506 (step 608). The control packets now have a priority code that is trusted within trusted domain 540.

Port 518 of network device 504 receives the control packet from trusted network 506 (step 610). Decoder 520 enqueues the control packet to one of queues 522 according to the priority code in the control packet and a mapping between the queues 522 and the priorities (step 612). In contrast to the conventional classifier 120 of FIG. 1, which classifies packets in a cumbersome and time-consuming manner according to a sequentially-executed set of rules, decoder 520 simply decodes the priority code in the control packet. As such, decoder 520 can be implemented very simply, for example as a demultiplexer.

Each queue 522 is associated with one or more of the priorities in the priority scheme. Scheduler 524 passes the control packets from queues 522 to CPP 514 according to a priority scheme for queues 522 such as round-robin or fairness (step 614).

In this manner, control traffic is prioritized and passed to the destination control plane processor in a fast, efficient, and trusted manner.

The invention can be implemented in digital electronic circuitry, or in computer hardware, firmware, software, or in combinations of them. Apparatus of the invention can be implemented in a computer program product tangibly embodied in a machine-readable storage device for execution by a programmable processor; and method steps of the invention can be performed by a programmable processor executing a program of instructions to perform functions of the invention by operating on input data and generating output. The invention can be implemented advantageously in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object-oriented programming language, or in assembly or machine language if desired; and in any case, the language can be a compiled or interpreted language. Suitable processors include, by way of example, both general and special purpose microprocessors. Generally, a processor will receive instructions and data from a read-only memory and/or a random access memory. Generally, a computer will include one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM disks. Any of the foregoing can be supplemented by, or incorporated in, ASICs (application-specific integrated circuits).

A number of implementations of the invention have been described. Nevertheless, it will be understood that various modifications may be made without departing from the spirit and scope of the invention Accordingly, other implementations are within the scope of the following claims.

The invention claimed is:

1. A network device comprising:
a first control plane processor configured to process a plurality of control packets that are i) generated by a second control plane processor separate from the first control plane processor, and ii) addressed to the first control plane processor; and
a first forwarding engine provided separately from the first control plane processor and configured to forward the plurality of control packets to the first control plane processor in a prioritized order, the first forwarding engine comprising
a plurality of first ports to receive the plurality of control packets, each control packet comprising a priority code inserted into an unused header field thereof and representing one of M priorities,
N queues each associated with one or more of the M priorities,
a decoder coupled to the plurality of first ports and the N queues, wherein the decoder is configured to enqueue a received control packet to one of the N queues based on a decoding of the priority code in the received control packet and a mapping between the N queues and the M priorities, wherein the decoding of the priority code in the received control packet provides sufficient information for selecting an appropriate one of the N queues for enqueuing the received control packet according to the mapping, and
a scheduler to pass the control packets from the N queues to the first control plane processor according to a priority scheme for the N queues.

2. An Ethernet switch comprising the network device of claim 1.

3. The Ethernet switch of claim 2, wherein the Ethernet switch is compliant with IEEE 802.3ab.

4. The network device of claim 1, wherein M=N.

5. The network device of claim 1, wherein the decoder comprises a demultiplexer.

6. A data communications system comprising:
a first network device comprising the network device of claim 1; and
a second network device provided separately from the first network device and in communication with the first network device via a network coupled therebetween, the second network device comprising,
the second control plane processor, wherein the second control plane processor is configured to generate the priority codes for the control packets based on characteristics of the control packets, and
a second forwarding engine comprising at least one second port to transmit the control packets to the first network device via the network.

7. The data communications system of claim 6, wherein characteristics of the control packets are selected from the group consisting of processor traffic protocols;
network protocols;
applications; and
addresses.

8. The data communications system of claim 7, wherein the processor traffic protocols are selected from the group consisting of:
Open Shortest Path First Protocol (OSPF); and
Routing Information Protocol (RIP).

9. The data communications system of claim 7, wherein the network protocols are selected from the group consisting of:
Dynamic Host Configuration Protocol (DHCP);
Simple Network Management Protocol (SNMP);
Internet Group Management Protocol (IGMP);
Trivial File Transfer Protocol (TFTP);
File Transfer Protocol (FTP);
Border Gateway Protocol (BGP); and
Transmission Control Protocol (TCP).

10. The data communications system of claim 7, wherein the applications are selected from the group consisting of:
ping; and
telnet.

11. A method for prioritizing control packet traffic, comprising:
receiving, via a plurality of first ports of a first network device, a plurality of control packets addressed to a first control plane processor of the first network device, each control packet comprising a priority code inserted into an unused header field thereof and representing one of M priorities, and each control packet generated by a second control plane processor separate from the first control plane processor;
decoding, with a forwarding engine of the first network device, the priority code in each received control packet;
enqueuing, with the forwarding engine, each received control packet to one of N queues based on (i) the decoding of the priority code in the received control packet and (ii) a mapping between the N queues and the M priorities, wherein the decoding of the priority code in the received control packet provides sufficient information for selecting an appropriate one of the N queues for enqueuing the received control packet according to the mapping; and
passing, with a scheduler, the control packets from the N queues to the first control plane processor according to a priority scheme for the N queues so that the plurality of control packets addressed to the first control plane processor are forwarded from the forwarding engine to the first control plane processor in a prioritized order.

12. The method of claim 1, wherein the enqueuing the received packet based on the mapping comprises using a mapping between the same number of queues and priorities.

13. The method of claim 11, further comprising:
at a second network device provided separately from the first network device and in communication with the first network device via a network coupled therebetween,
generating, with the second control plane processor, the priority codes for the control packets based on characteristics of the control packets, and
transmitting the control packets to the first network device.

14. The method of claim 13, wherein the generating the priority codes for the control packets comprises determining the priority codes based on the characteristics of the control packets, wherein the characteristics of the control packets are selected from the group consisting of:
processor traffic protocols;
network protocols;
applications; and
addresses.

15. The method of claim 14, wherein the determining the priority codes comprises determining the priority codes based on the processor traffic protocols, wherein the processor traffic protocol are selected from the group consisting of:
Open Shortest Path First Protocol (OSPF); and
Routing Information Protocol (RIP).

16. The method of claim 14, wherein the determining the priority codes comprises determining the priority codes based on the network protocols, wherein the network protocols are selected from the group consisting of:
Dynamic Host Configuration Protocol (DHCP);
Simple Network Management Protocol (SNMP);
Internet Group Management Protocol (IGMP);
Trivial File Transfer Protocol (TFTP);
File Transfer Protocol (FTP);
Border Gateway Protocol (BGP); and
Transmission Control Protocol (TCP).

17. The method of claim 14, wherein the determining the priority codes comprises determining the priority codes based on the applications, wherein the applications are selected from the group consisting of:
ping; and
telnet.

18. A network system comprising:
a first network device comprising a first control plane processor; and
a second network device provided separately from the first network device and in communication with the first network device via a network coupled therebetween, the second network device comprising:
a plurality of ports configured to receive a plurality of control packets i) generated by a second control plane processor separate from the first control plane processor, and ii) addressed to the first control plane processor of the first network device; and
a classifier configured to determine one of a plurality of priorities for each of the control packets based on characteristics of the control packets, and to insert a priority code representing the determined priority into an unused header field of each of the control packets,
wherein the ports transmit the control packets comprising the priority codes to the first network device via the network, and
wherein the first network device is configured to enqueue a control packet received from the second network device via the network to one of a plurality of queues based on a decoding of the priority code in the received control packet and a mapping between the plurality of queues and a plurality of priorities, wherein the decoding of the priority code in the received control packet provides sufficient information for selecting an appropriate one of the plurality of queues for enqueuing the received control packet according to the mapping.

19. An Ethernet switch comprising the second network device of claim 18.

20. The Ethernet switch of claim 19, wherein the Ethernet switch is compliant with IEEE 802.3ab.

21. The network system of claim 18, wherein the characteristics of the control packets are selected from the group consisting of:
processor traffic protocols;
network protocols;
applications; and
addresses.

22. The network system of claim 21, wherein the processor traffic protocols are selected from the group consisting of:
  Open Shortest Path First Protocol (OSPF); and
  Routing Information Protocol (RIP).

23. The network system of claim 21, wherein the network protocols are selected from the group consisting of:
  Dynamic Host Configuration Protocol (DHCP);
  Simple Network Management Protocol (SNMP);
  Internet Group Management Protocol (IGMP);
  Trivial File Transfer Protocol (TFTP);
  File Transfer Protocol (FTP);
  Border Gateway Protocol (BGP); and
  Transmission Control Protocol (TCP).

24. The network system of claim 21, wherein the applications are selected from the group consisting of:
  ping; and
  telnet.

25. A data communication system comprising:
  a first network device comprising the network device of claim 1; and
  a second network device provided separately from the first network device and in communication with the first network device via a network coupled therebetween, the second network device comprising,
   a plurality of second ports configured to receive the plurality of control packets addressed to the first control plane processor of the first network device; and
   a classifier configured to determine one of the M priorities for each of the control packets and insert a priority code representing the determined priority into the control packet.

26. The data communication system of claim 25, wherein the classifier determines one of the M priorities for each control packet based on at least one of processor traffic protocols, network protocols, applications and addresses.

27. The data communication system of claim 25, wherein the second network device further comprises:
  a plurality of third ports coupled to the network; and
  a second forwarding engine comprising the classifier,
   wherein the second forwarding engine is configured to transmit each control packet comprising the priority code to the first network device via the plurality of third ports.

* * * * *